UNITED STATES PATENT OFFICE.

IVAN LEVINSTEIN AND ERNEST EUGENE NAEF, OF MANCHESTER, ENGLAND.

GREEN-BLUE SULFUR DYE AND PROCESS OF MAKING SAME.

No. 802,049. Specification of Letters Patent. Patented Oct. 17, 1905.

Application filed January 6, 1904. Serial No. 187,868. (Specimens.)

*To all whom it may concern:*

Be it known that we, IVAN LEVINSTEIN, a subject of the King of Great Britain and Ireland, and ERNEST EUGENE NAEF, a citizen of the Swiss Republic, both residents of Manchester, in the county of Lancaster, England, have invented new and useful Improvements in and Relating to the Manufacture of New Sulfurized Dyestuffs, of which the following is a specification.

We have found that para-nitrosophenol and para-nitroso-ortho-cresol or any of the two said compounds which contain a chlorin atom in the ortho position to the hydroxyl group condense under suitable conditions with amido-sulfo acids of the benzin and naphthalene series, which have the para position to the amido group unoccupied forming blue-colored compounds. These substances or their reduction products yield, when heated with sodium polysulfids, most valuable new dyestuffs which dye unmordanted cotton greenish-blue shades fast to acid and light.

The following examples will serve to illustrate the nature of this invention.

We dissolve forty-five parts of Cleves acid (either the technical mixture of this acid or any of the pure isomers) in one hundred and forty parts of sulfuric acid (seventy per cent.) at 30° centigrade. In cooling down part of the Cleves acid separates out in a very fine state of division. To the mixture, at a temperature of from 10° to 20° centigrade, are gradually added twenty-five parts of para-nitrosophenol. After the condensation is finished the result is poured into a concentrated aqueous solution of one hundred and twenty-five parts of soda carbonate, when a dark resinous matter is precipitated. This matter is filtered off and may directly be used for transformation into a sulfur color; but it is preferable to reduce the condensation product with a very dilute solution of sodium sulfid, by which an easily-soluble leuco compound is formed, which can be precipitated by addition of a mineral acid or bicarbonate of soda and salt. The reduction can also be made by any other suitable reducing agent. The leuco compound forms a gray powder soluble in caustic alkali, which solution oxidizes rapidly in contact with air.

For the subsequent transformation of the direct condensation products or the corresponding leuco compounds into sulfurized dyestuffs we proceed, for instance, as follows: Ten parts of the leuco base obtained, as in the foregoing example or the corresponding derivative obtained with nitroso-ortho-cresol are added to a hot solution of forty parts of crystallized sodium sulfid and ten parts of sulfur and heated for about from twenty-four to thirty-six hours at from 110° to 120° centigrade with or without a reflux condenser. Out of the dark-colored melt, which contains the new color as a leuco compound, the new dye can be separated by the addition of a mineral acid or by oxidizing it with a current of air. If in the described example the temperature of the sulfur melt is kept at about 100° centigrade or below, bluer shades are obtained.

The new color dyes direct vegetable fiber a nice greenish-blue.

Instead of the product of condensation obtained with Cleves acid, other amidosulfo acids of the benzin and naphthalene class which have a para position to the amido group unoccupied may be used.

The coloring-matters produced according to this invention are insoluble in cold and hot water, soluble in concentrated sulfuric acid with a greenish-blue color, insoluble in caustic alkali and soda carbonate, alcohol, anilin, and benzin. They are soluble in sodium sulfid with a grayish-blue color, forming a leuco compound, and dye vegetable fibers a greenish-blue tint.

What we desire to claim as our invention is—

1. The process of producing greenish-blue sulfur dyestuffs which consists in condensing para-nitrosophenol with Cleves acids and reducing the result thus obtained to a colorless leuco compound and heating the latter with alkali polysulfids, substantially as and in the manner described.

2. The process of producing greenish-blue sulfur dyestuffs, which consists in condensing para-nitrosophenol with Cleves acids, reducing the result thus obtained, and heating the product with alkali polysulfids, substantially as and in the manner described.

3. The greenish-blue sulfur dyestuffs which are insoluble in cold and hot water, soluble in concentrated sulfuric acid with a greenish-blue color, insoluble in caustic alkali and soda carbonate, alcohol, anilin and benzin, soluble in sodium sulfid with a grayish-blue color forming a leuco compound and dyeing vegetable fibers a greenish-blue tint, and which dyestuffs are produced by condensing para-nitrosophenol with Cleves acids and reducing the result thus obtained to a colorless leuco compound and heating the leuco base with alkali polysulfids, substantially as herein described.

4. The greenish-blue sulfur dyestuffs which are insoluble in cold and hot water, soluble in concentrated sulfuric acid with a greenish-blue color, insoluble in caustic alkali and soda carbonate, alcohol, anilin and benzin, soluble in sodium sulfid with a grayish-blue color forming a leuco compound and dyeing vegetable fibers a greenish-blue tint, and which dyestuffs are produced by condensing para-nitrosophenol with Cleves acids and heating the condensation product with alkali polysulfid, substantially as herein described.

In testimony whereof we have signed our names to this specification in the presence of two subscribing witnesses.

IVAN LEVINSTEIN.
ERNEST EUGENE NAEF.

Witnesses:
WILLIAM GEO. HEYS,
FRANK A. HEYS.